(12) United States Patent
Humbert et al.

(10) Patent No.: US 10,821,917 B2
(45) Date of Patent: Nov. 3, 2020

(54) PANEL FOR COVERING AND/OR SOUNDPROOFING A WALL OF A VEHICLE AND ASSOCIATED METHOD OF MANUFACTURE

(71) Applicants: HOWA TRAMICO, Ecully (FR); FIBROLINE, Ecully (FR)

(72) Inventors: Clément Humbert, Saint Etienne (FR); Vincent Bonin, Saint Germain Au Mont D'or (FR); Laurent Mougnard, Saint Surplice sur Risle (FR)

(73) Assignee: HOWA TRAMICO, Brionne (FR)

( * ) Notice: Subject to any disclaimer, the term of this patent is extended or adjusted under 35 U.S.C. 154(b) by 251 days.

(21) Appl. No.: 15/571,403

(22) PCT Filed: May 2, 2016

(86) PCT No.: PCT/FR2016/051033
§ 371 (c)(1),
(2) Date: Nov. 2, 2017

(87) PCT Pub. No.: WO2016/177960
PCT Pub. Date: Nov. 10, 2016

(65) Prior Publication Data
US 2018/0126924 A1    May 10, 2018

(30) Foreign Application Priority Data
May 4, 2015   (FR) ...................................... 15 53979

(51) Int. Cl.
*B60R 13/08* (2006.01)
*B29C 70/50* (2006.01)
(Continued)

(52) U.S. Cl.
CPC ............ *B60R 13/08* (2013.01); *B29C 70/506* (2013.01); *B32B 5/022* (2013.01); *B32B 5/18* (2013.01);
(Continued)

(58) Field of Classification Search
CPC ..... B60R 13/08; B60R 13/0815; B32B 5/022; B32B 5/18; B32B 5/245; B32B 5/26;
(Continued)

(56) References Cited

U.S. PATENT DOCUMENTS 4,798,756 A * 1/1989 Fukushima ............. B32B 27/12
428/198
5,976,295 A    11/1999 Ang
(Continued)

FOREIGN PATENT DOCUMENTS

| | | |
|---|---|---|
| EP | 1526214 A1 | 4/2005 |
| EP | 1875822 A1 | 1/2008 |
| WO | WO-2005037897 A1 | 4/2005 |

OTHER PUBLICATIONS

Translation of EP 1875822; accessed Dec. 16, 2019 via Espacenet.*
(Continued)

*Primary Examiner* — Jeremy A Luks
(74) *Attorney, Agent, or Firm* — Marshall, Gerstein & Borun LLP

(57) ABSTRACT

A panel for covering and/or soundproofing a wall of a vehicle includes a central layer produced by impregnating a flexible and porous material with a thermoformable resin, then rigidifying the thermoformable resin. The panel also includes two reinforcement layers arranged on either side of the central layer. The impregnation of the flexible and porous material with the thermoformable resin is carried out deep within the flexible and porous material by subjecting a powder of the thermoformable resin to an alternating electric (Continued)

field, the two reinforcement layers being made of a flexible or semi-rigid material.

5 Claims, 3 Drawing Sheets

(51) Int. Cl.

| | | |
|---|---|---|
| *B32B 5/26* | (2006.01) | |
| *B32B 5/02* | (2006.01) | |
| *B32B 5/18* | (2006.01) | |
| *B32B 7/12* | (2006.01) | |
| *B32B 27/12* | (2006.01) | |
| *B32B 37/02* | (2006.01) | |
| *B32B 37/10* | (2006.01) | |
| *B32B 37/24* | (2006.01) | |
| *B32B 38/08* | (2006.01) | |
| *B32B 5/24* | (2006.01) | |
| *H05B 6/62* | (2006.01) | |
| *H05B 6/60* | (2006.01) | |
| *B60R 13/02* | (2006.01) | |

(52) U.S. Cl.
CPC ............... *B32B 5/26* (2013.01); *B32B 7/12* (2013.01); *B32B 27/12* (2013.01); *B32B 37/02* (2013.01); *B32B 37/10* (2013.01); *B32B 37/24* (2013.01); *B60R 13/02* (2013.01); *H05B 6/60* (2013.01); *H05B 6/62* (2013.01); *B32B 5/245* (2013.01); *B32B 38/08* (2013.01); *B32B 2260/02* (2013.01); *B32B 2260/046* (2013.01); *B32B 2262/0276* (2013.01); *B32B 2264/02* (2013.01); *B32B 2266/0214* (2013.01); *B32B 2266/06* (2013.01); *B32B 2305/022* (2013.01); *B32B 2305/20* (2013.01); *B32B 2307/102* (2013.01); *B32B 2307/546* (2013.01); *B32B 2307/738* (2013.01); *B32B 2310/021* (2013.01); *B32B 2605/003* (2013.01); *B32B 2605/08* (2013.01); *B32B 2607/00* (2013.01)

(58) Field of Classification Search
CPC ........... B32B 7/12; B32B 27/12; B32B 37/02; B32B 37/10; B32B 37/24; B32B 38/08; B29C 70/506

USPC ........................................................ 181/290
See application file for complete search history.

(56) References Cited

U.S. PATENT DOCUMENTS

| | | | | |
|---|---|---|---|---|
| 6,322,658 | B1 * | 11/2001 | Byma ...................... | B32B 7/02 156/272.2 |
| 6,733,845 | B1 * | 5/2004 | Caramaro ............. | B29B 15/105 427/477 |
| 7,534,473 | B2 * | 5/2009 | Marduel ............... | B29C 70/465 427/458 |
| 7,757,809 | B2 * | 7/2010 | Pfaffelhuber ......... | B60R 13/083 181/204 |
| 8,016,072 | B2 * | 9/2011 | Oosting ................ | B29C 43/203 181/286 |
| 8,388,780 | B2 * | 3/2013 | Caramaro ............. | B29C 70/506 156/62.2 |
| 8,827,342 | B2 * | 9/2014 | Kuroda .................. | B60R 5/044 296/37.16 |
| 8,967,079 | B2 * | 3/2015 | Marduel ................ | B29B 15/12 118/620 |
| 2004/0235376 | A1 * | 11/2004 | Byma .................... | B32B 3/266 442/38 |
| 2008/0099944 | A1 * | 5/2008 | Lipprandt .............. | B32B 15/08 264/41 |
| 2016/0228909 | A1 * | 8/2016 | Marduel ................ | B29B 15/12 |

OTHER PUBLICATIONS

"Fibroline Impregnation Technology—technology for nonwovens textiles". Retrieved from the Internet at: <URL:http://web.archive.org/web/20141219140258/http://www.fibroline.com/#!technologies/cldiw> Aug. 30, 2016.

International Search Report issued in PCT/FR2016/051033, dated Sep. 14, 2016.

Written Opinion issued in PCT/FR2016/051033, dated Sep. 14, 2016.

\* cited by examiner

PANEL FOR COVERING AND/OR SOUNDPROOFING A WALL OF A VEHICLE AND ASSOCIATED METHOD OF MANUFACTURE

TECHNICAL DOMAIN

The following disclosure concerns a panel for covering and/or soundproofing a vehicle, for example an automotive vehicle. Said panel is particularly suited for covering and/or soundproofing a compartment in an automotive vehicle such as panels positioned under the roof or lateral walls.

BACKGROUND

There are many constraints on the interior panels of automotive vehicles. Said panels must be lightweight to optimize vehicle weight, they must be thermoformable to follow the contours of the vehicle, they must effectively absorb acoustic waves and restrict interior vehicle noise, they must comply with fire safety regulations, and must be compact such as to avoid malformation over time. Few methods exist for the manufacture of such material.

Patent application FR 2 503 721 describes a method for the manufacture of a panel that meets these constraints. Said panel is composed of a central layer and two reinforcement layers arranged on either side of the central layer. The central layer meets lightness, flexibility and sound absorption requirements, while the two reinforcement layers meet mechanical strength requirements. In order to achieve this, the central layer is made of a foam impregnated with a liquid resin that is then cross-linked. The resin used is MDI (for 4-4' diphenylmethane diisocyanate). The upper face is covered with a protective layer designed to come into contact with a vehicle component, and a lower face is covered with a decorative layer in order to improve the aesthetics of the panel to the vehicle user. The resin contained in the foam rigidifies when all layers are bonded during thermoforming such that the panel takes the desired shape.

However, the mechanical strength of the cross-linked foam is not sufficient, requiring the use of especially rigid reinforcement layers such as fiberglass. Fiberglass reinforcement layers present problems in recycling the panel. It is not unusual for part of the panel to be cut out to make an opening for a glass roof on the vehicle. In such cases, the portion of the panel removed for the glass roof is cut up and scrapped. The presence of resin and glass within this waste restricts recycling.

The method for manufacturing the panel presents further constraints because the liquid resin is fed into the foam by seal rollers in order to impregnate the foam, then placed in contact with a catalyst. The reaction of the catalyst with the resin causes the release of volatile compounds (VOCS) into the air that can result in a foul odor that is unpleasant to panel production workers. Further, the panel must be formed before the resin cross-links, necessitating constant movement of the production line. For example, if the assembly line is stopped, the resin-impregnated foam starts to harden before it goes into a thermoforming mold, and the unfinished parts must be scrapped.

The method of impregnating the foam with resin must also be carefully calibrated for each series of parts because the amount of resin in the foam is a crucial element. If the foam contains too much resin, the resin will pass through the decorative layer and be visible at the corners, defacing the decorative layer. If the foam contains too little resin, the panel will be too pliable and not have sufficient mechanical strength. Perfecting the amount of resin for each series of parts is a complex iterative process that requires a great deal of experience.

There is therefore a need for a new panel for the interior of an automobile that meets the aforementioned requirements but with an improved manufacturing process.

SUMMARY OF THE DISCLOSURE

The present disclosure concerns a new material that meets all of the above requirements, but the foam is impregnated using a dry method, with no liquid impregnation.

An initial portion of this disclosure concerns a panel for covering and/or soundproofing a wall of a vehicle, the aforesaid panel comprising:
  a central layer formed by impregnating thermoformable resin into a flexible and porous material, then rigidifying the thermoformable resin, and
  two reinforcement layers arranged on either side of the central layer,
  impregnation of the flexible and porous material by the thermoformable resin carried out deep within the flexible and porous material by subjecting a powder from the aforesaid thermoformable resin to an alternating electric field,
  the two reinforcement layers manufactured with a flexible or semi-rigid material.

The disclosed embodiments thus yield a panel for a compartment within an automotive vehicle that is both lightweight, thermoformable, soundproof, complying with all obligations for safety and compactness. The flexible and porous material that forms the core layer may advantageously be a foam made up at least partially of open cells.

The impregnation of the resin deep within the cellular core of the foam and the use of reinforcement layers made of flexible or semi-rigid materials improves the breakdown of the resin and cohesion between the reinforcement layers and the central layer. Reinforcing fiberglass layers are no longer necessary, and the panel is henceforth easier to recycle.

Problems with odor and the perfection of the wet fabrication process are also eliminated with the dry method, wherein the thermoformable resin is impregnated into the flexible and porous material without using liquid. Thermoformable resin rigidifying can be carried out well after the thermoformable resin has penetrated the material, eliminating the time constraints related to the drying of the liquid thermoformable resin within the flexible and porous material.

According to one embodiment, at least one reinforcement layer is manufactured by impregnating a thermoformable resin powder into a second porous material by subjecting it to an alternating electric field. Dry impregnated resins can be rigidified at a later time; the reinforcement layers can be manufactured by a method similar to that of the central layer on an ancillary production line. Preferably, the second porous material is a non-woven fabric with a synthetic fiber base. Alternatively, the second porous material is a fabric made of natural or other fibers.

According to one manufacturing method, the panel consists of a decorative layer bonded by a heat-sealing layer to the face of a reinforcement layer. Advantageously, the panel also includes a protective layer bonded by a heat-sealing layer to one face of a reinforcing layer.

According to a second aspect, the disclosure describes a method for the manufacture of a panel according to the initial aspect wherein the method comprises the following steps:
- depositing a thermoformable resin in powder form onto the flexible and porous material,
- impregnating the thermoformable resin deep within the flexible and porous material by applying an alternating electric field through the flexible and porous material, and
- bonding the thermoformable resin to the flexible and porous material by softening.

According to a first embodiment of the manufacturing process, the method comprises the following steps:
- assembling a lower reinforcement layer onto a lower face of the flexible and porous material prior to the step of depositing a thermoformable resin, and
- assembling an upper reinforcement layer onto an upper face of a flexible and porous material prior to the step of impregnating the thermoformable resin,
- manufacturing the reinforcement layers using a second porous material.
- impregnating the thermoformable resin being capable of impregnating the second porous materials of the reinforcement layers.

Said embodiment allows for the simultaneous impregnation of the central layers and reinforcement layers.

According to a second embodiment of the manufacturing process, the method comprises the following steps:
- assembling a lower reinforcement layer onto a lower face of the flexible and porous material after the step of impregnating the thermoformable resin, and
- assembling an upper reinforcement layer onto an upper face of a flexible and porous material after the step of impregnating the thermoformable resin,
- manufacturing the reinforcement layers using a second porous material for each reinforcement layer, the method comprising the following steps:
- depositing a thermoformable resin in powder form onto the second porous material,
- impregnating the thermoformable resin deep within the flexible and porous material by applying an alternating electric field through the second porous material, and
- bonding the thermoformable resin onto the second porous material by softening Said embodiment allows for the modification of the compound of the resin, and/or the flexible and porous material, between the central layer and the reinforcement layers.

Advantageously, the method comprises the following steps:
- assembling the second porous materials of the reinforcement layers prior to the step of impregnating the thermoformable resin, and
- separating the two second porous materials after the step of bonding the thermoformable resin by softening,
- the step of impregnating the thermoformable resin being capable of impregnating both of the second porous materials.

Said embodiment allows for the fabrication of the two reinforcement layers on a single production line.

According to one embodiment, the step consists of bonding the thermoformable resin onto the flexible and porous material by softening, comprising the following steps:
- applying heat-bonding pressure to the flexible and porous material and
- releasing the pressure such that the flexible and porous material reinflates.

Said embodiment makes it possible to disperse the resin over the flexible and porous material and to bond the various layers, taking advantage of the ability of the flexible and porous material to partially resume the original thickness thereof when it is no longer constrained, whilst being hot.

Said reinflation may occur immediately after leaving the plant that applies pressure to the porous material, in order to fabricate parts of a relatively thick semi-finished product that will later be thermoformed. It is also possible for reinflation to occur during thermoforming, taking advantage of the available heat within the thermoforming plant, wherein case parts of the semi-finished products are not as thick, and the fabrication facility simplified.

According to one embodiment, the step of depositing the resin is performed by dispersing it over one face of the flexible and porous material.

According to one embodiment, the steps for depositing and impregnating the resin are performed by localized application. Said embodiment also enables the depositing and impregnating of the thermoformable resin in a localized manner within the flexible and porous material such as to create collapsed surfaces wherein the flexible and porous material is not impregnated with resin or else impregnated in an insufficient quantity. Said waste surfaces can be cut out later for some specific use, in order to create a sun roof, for example. Said waste surfaces can be more easily recycled than existing waste by separating the non-impregnated layers without fiberglass. In addition, this embodiment saves on resin.

BRIEF DESCRIPTION OF THE FIGURES

The manner of implementing the contemplated embodiments as well as the advantages deriving therefrom will be clearly seen from the following embodiment, provided by way of non-limiting example, as a function of the appended figures wherein

FIG. 1: a schematic representation according to a cross-sectional view of an interior panel of an automobile;

FIG. 2: a schematic representation of a process for manufacturing the panel in FIG. 1 according to a first embodiment;

FIG. 3: a schematic representation of a process for manufacturing the panel in FIG. 1 according to a second embodiment.

DETAILED DESCRIPTION

Figure 1:
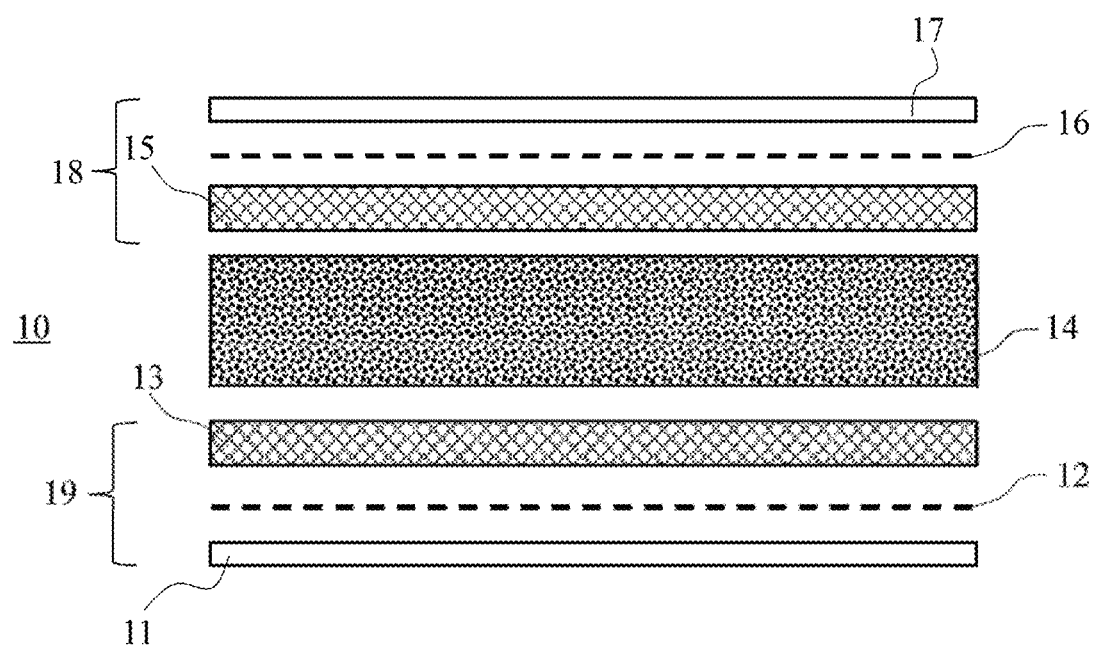
FIGS. 1 to 3 represent.

FIG. 1 shows a panel 10 with multiple layers for the interior of an automobile 11-17. A central layer 14 is framed by upper layers 18 and lower layers 19. The central layer 14 is directly surrounded by two reinforcement layers 13, 15. The central layer 14 is formed by impregnating 46 a thermoformable resin 21 deep within a flexible and porous material 20 then rigidifying the thermoformable resin 21. For example, the flexible and porous material 20 is a polyether foam formed at least partially from open cells with a density greater than 5 Kg/m$^3$ In the description for this embodiment, the term "foam" shall be used to designate the flexible and porous material 20.

The impregnation 46 of the thermoformable resin 21 is carried out by applying an alternating electric field through the foam 20. Each reinforcement layer 13, 15 is bonded to an external layer 11, 17 by a heat-sealing layer 12, 16. For example, the heat-sealing layer may be a film, an apertured film, a powder layer or a heat-sealing wire. Preferably, the heat-sealing layer bonded to the decorative layer must be permeable to air when the foam requires acoustic properties. The lower reinforcing layer 13 is bonded to a decorative layer 11 by a heat-sealing layer 12 and the upper reinforcing layer 15 is bonded to a protective layer 17 by a heat-sealing layer 16. The reinforcing layers 13, 15 are manufactured using a flexible or semi-rigid material. Preferably, the reinforcing layers 13, 15 are manufactured using a second porous material 23, 63. For example, the second porous material 23, 63 is a non-woven fabric based upon synthetic fibers, particularly polyester, with a mass surface density greater than 10 g/m². In the description for this embodiment, the term "non-woven" shall be used to designate the second porous material 23, 63.

Figure 2:
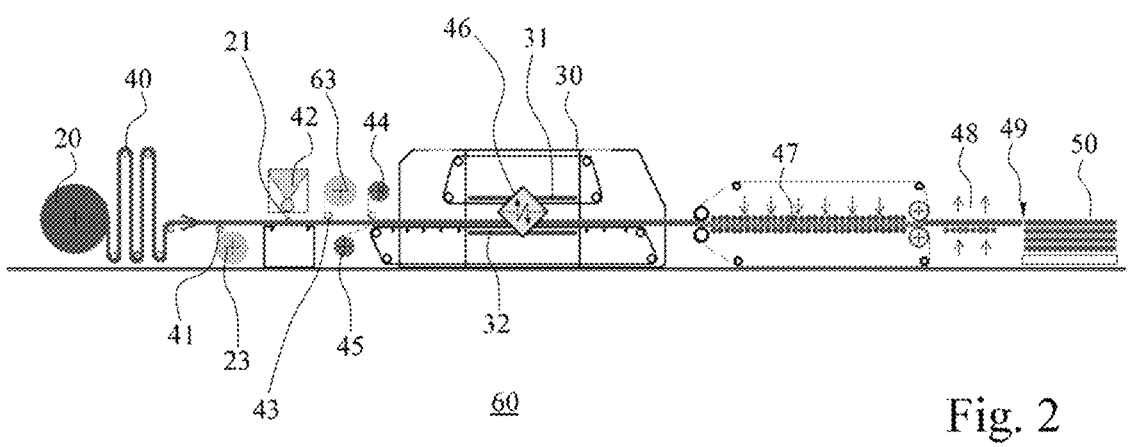

FIG. 2 illustrates a first example of the embodiment of the panel 10. A foam 20 is wound at the start of the production line 60 Said foam 20 is unwound during the manufacture process to form the panel 10. The first step 40 is to collect the foam 20 to make a roller change without stopping the production line 60. The lower face of the foam 20 is then covered 41 with a non-woven 23 that forms the reinforcement layer 13. The next step is to deposit 42 a thermoformable resin 21 in powder form onto the upper face of the foam 20 to form the central layer 14. For example, the thermoformable resin 21 is an epoxy powder with a granulometry ranging between 0 and 100 μm. The quantity of thermoformable resin 21 deposited is measured precisely, ranging from 20 to 500 g/m² for example, According to step 42 for depositing the thermoformable resin 21, a non-woven 63 capable of forming the upper reinforcement layer 15 is added 43 to the upper face of the foam 20. A heat-sealing layer 16 and a protective layer 17 are then added 44 to the non-woven 63 A heat-sealing layer 12 and a decorative layer 11 are also added 45 to the non-woven 23 The product thus obtained is introduced into an impregnation chamber 30 containing higher 31 and lower electrodes 32 to create an alternating electric field through the foam 20 and the non-woven 23, 63 to move the thermoformable resin 21 to the center of the foam 20 and the non-woven 23, 63. Preferably, the amplitude of the alternating electric field is between 500 and 5000 volts/mm, preferentially between 1000 and 3000 volts/mm, at a frequency of approximately 50 Hz. The impregnation chamber 30 thus allows the thermoformable resin to be uniformly distributed 21 to the interior of the foam 20 and the non-woven 23, 63. During impregnation 46, the presence of heat-sealing layers 12, 16 sealed to the thermoformable resin 21 contains the thermoformable resin 21 inside the foam 20 and the non-woven 23, 63.

When it leaves the chamber 30, the product obtained contains all the constituent elements of the final layers 11-17 with effective impregnation 46 of the thermoformable resin 21 into the foam 20 and the non-woven 23, 63. The product obtained is heat-pressed 47 by calendering between two sets of cylinders to spread the thermoformable resin 21 to the core of the fibers and to bond the thermoformable resin 21. The pressure is then released 48 under heat in such a way that the foam 20 and can recover volume [sic]. To finish, the semi-finished product is cut 49 to the desired dimensions then stacked 50. To complete fabrication of the panel 10, the semi-finished product is thermoformed in a thermoforming mold (not shown) such as to obtain the central layer 14 and the reinforcement layers 13, 15. The production line 60 shown in FIG. 2 produces several dozen meters of semi-finished products per minute over a width of several meters. Rigidifying may be carried out after storage and/or transportation of the semi-finished product, which facilitates the panel manufacturing process 10. Alternatively, rigidifying may be carried out on the same production line 60 eliminating steps and cutting 49 and storage 50. Storage 50 can also be carried out by winding the semi-finished product, thereby eliminating the cutting step 49.

Figure 3:
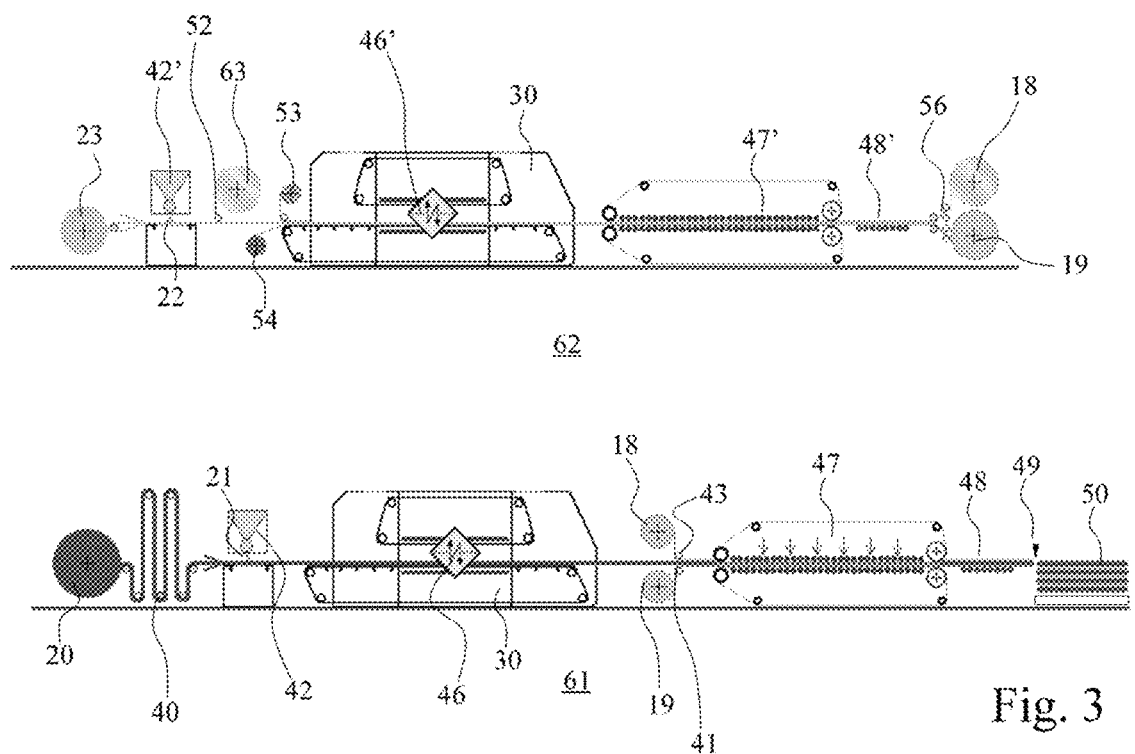

FIG. 3 illustrates a second example of the manufacture of the panel 10. In the same manner as for the production line 60 in FIG. 2, a foam 20 is wound at the start of the production line 61. The first step 40 is to collect the foam 20 to make a roller change without stopping the production line 61. The next step is to deposit 42 a thermoformable resin 21 in powder form onto the upper face of the foam 20. The product thus obtained is introduced into an impregnation chamber 30 to create an alternating electric field through the foam 20 such as to move the thermoformable resin 21 into the core of the foam 20.

When leaving the chamber 30, the lower face of the foam 20 is bonded 41 to the lower layers 19 and the upper face is bonded 43 to the upper layers 18. The product obtained contains all the constituent elements of the final layers 11-17 with effective impregnation 46 of the thermoformable resin 21 into the foam 20. The product obtained is pressed 47 under heat by calendering between two sets of cylinders to spread the thermoformable resin 21 into the core of the fibers and to bond the thermoformable resin 21 that lines the interior of the cells of the foam. The pressure is then released 48 under heat in such a way that the foam 20 and the non-woven 23, 63 can recover volume. To finish, the semi-finished product is cut 49 to the desired dimensions then stacked 50. To complete manufacture of the panel 10, the semi-finished product is thermoformed in a thermoforming mold (not shown).

Unlike the manufacturing method in FIG. 2, the elements constituting the reinforcement layers 13, 15 are bonded to heat-sealing layers 12, 16 and to external layers 11, 17 on a specific production line 62. Said production line 62 carries a non-woven 23 wound at the start of the production line. The first step 42' is to deposit a thermoformable resin 22 in powder form onto the upper face of the non-woven 23. The quantity of thermoformable resin 22 deposited is measured precisely, ranging from 20 to 500 g/m² for example, as in the step 42' for depositing thermoformable resin 22, another non-woven 63 is added 52 to the upper face of the non-woven 23. A heat-sealing layer 12 and a decorative layer 11 are then added 54 to the lower face of the non-woven 23 A heat-sealing layer 16 and a protective layer 17 are also added 53 to the non-woven 63 The product thus obtained is introduced into an impregnation chamber 30 to create an alternating electric field through the non-woven 23 such as to move the thermoformable resin 22 into the core of the non-woven 23. The product thus obtained is pressed 47 under heat by calendering between two sets of cylinders to spread the thermoformable resin 22 to the core of the fibers and to set the thermoformable resin 22. The pressure is then released 48 under heat in such a way that the foam and the non-woven 23, 63 can recover volume.

The two non-wovens 23, 63 are then separated 56 to obtain the constituent elements of the both the upper 18 and lower 19 layers. Said elements are then used as intermediate products for steps 41 and 43 of the manufacturing chain 61. To finish, the final step (not shown) of rigidifying the thermoformable resin 21 of the semi-finished product makes it possible to rigidify the thermoformable resin 22 of the reinforcement layers 13, 15.

In this example, the two reinforcement layers 13, 15 bonded to heat-sealing layers 12, 16 and to external layers 11, 17 are carried out on the same production line 62 by combining with the non-wovens 23, 63. Alternatively, the two reinforcement layers 13, 15 bonded to the heat-sealing layers 12, 16 and to the external layers 11, 17 can be manufactured on independent production lines. Alternatively, the number of layers 11-17 or the position of the external outer layers 11, 17 of panel 10 can be changed without departing from the scope of the contemplated embodiments.

The contemplated embodiments thus make it possible to produce a panel 10 for the interior of an automobile that is both lightweight, thermoformable and that absorbs soundwaves, in compliance with safety and compactness obligations. The flexible and porous material that forms the core layer may advantageously be a foam made up at least partially of open cells.

The invention claimed is:

1. A method for manufacturing a panel for covering a wall of a vehicle, soundproofing a wall of a vehicle, or both, the panel comprising a central layer produced by impregnating a flexible and porous material with a thermoformable resin, then rigidifying the thermoformable resin, and two reinforcement layers arranged on either side of the central layer, the impregnation of the flexible and porous material by the thermoformable resign being carried out deep within the flexible and porous material by subjecting a powder of said thermoformable resin to an alternating electric field, the two reinforcement layers being manufactured using a flexible or semi-rigid material, the method comprising the following steps:

depositing the thermoformable resin in powder form onto the flexible and porous material,
   impregnating the thermoformable resin deep within the flexible and porous material by applying an alternating electric field through the flexible and porous material, and
   bonding the thermoformable resin to the flexible and porous material by softening,
   assembling a lower reinforcement layer onto a lower face of the flexible and porous material after the step of impregnating the thermoformable resin,
   assembling an upper reinforcement layer onto an upper face of the flexible and porous material after the step of impregnating the thermoformable resin,
   fabricating the reinforcing layers from a second porous material,
   for each reinforcement layer the method comprises the following steps:
      depositing a thermoformable resin in powder form onto the second porous material,
      impregnating the thermoformable resin deep within the second porous material by applying an alternating electric field through the second porous material, and
   bonding the thermoformable resin to the second porous material by softening.

2. A method according to claim 1, wherein the process comprises the following steps:
   assembling the second porous materials of the reinforcement layers prior to the step of impregnating the thermoformable resin, and
   separating the two second porous materials according to the step of bonding the thermoformable resin by softening,
   the step of impregnating the thermoformable resin being capable of impregnating the two second porous materials.

3. A method according to claim 1, wherein the step consisting of bonding the thermoformable resin to the flexible and porous material by softening, comprises the following steps:
   heat-pressing the flexible and porous material, and
   releasing the pressure such that the flexible and porous material reinflates.

4. A method according to claim 1, wherein the step consisting of depositing the resin is carried out by dispersing it over a face of the flexible and porous material.

5. A method according to claim 1, wherein the step of depositing and impregnating the resin is carried out in a localized manner.

* * * * *

UNITED STATES PATENT AND TRADEMARK OFFICE
CERTIFICATE OF CORRECTION

PATENT NO. : 10,821,917 B2
APPLICATION NO. : 15/571403
DATED : November 3, 2020
INVENTOR(S) : Clement Humbert et al.

Page 1 of 1

It is certified that error appears in the above-identified patent and that said Letters Patent is hereby corrected as shown below:

On the Title Page

At item (71), Lines 1-2, "HOWA TRAMICO, Ecully (FR); FIBROLINE, Ecully (FR)" should be -- HOWA TRAMICO, Brionne (FR) --.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*